C. A. SHEA.
WINDSHIELD CLEANER.
APPLICATION FILED JAN. 10, 1920.
1,345,330. Patented June 29, 1920.
2 SHEETS—SHEET 1.
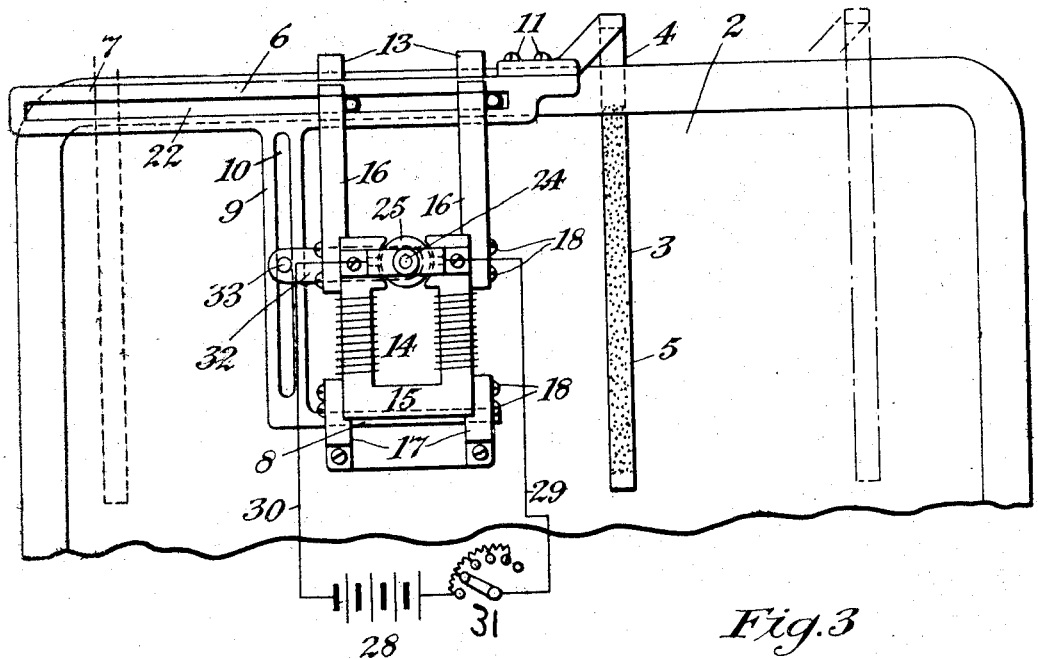
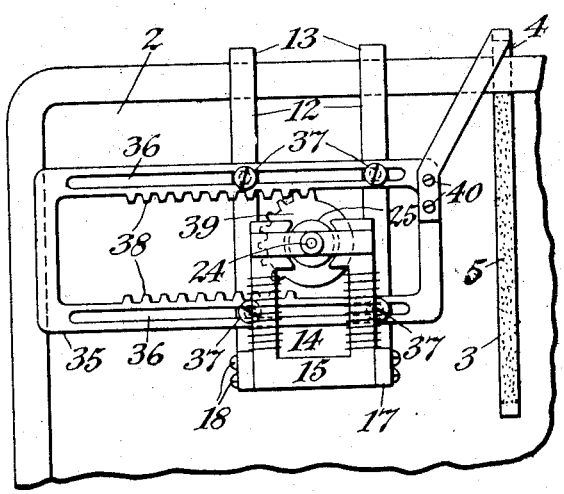
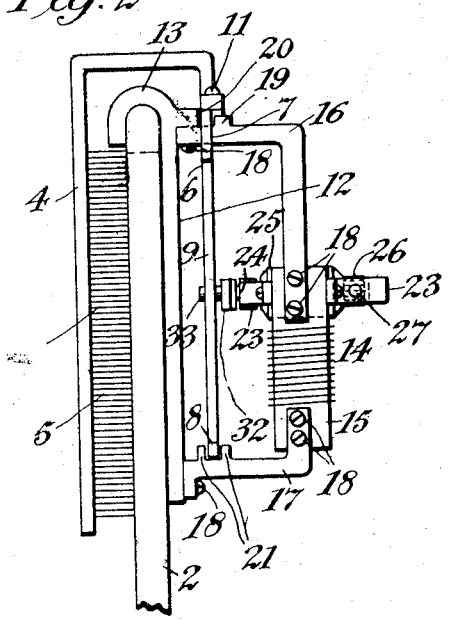
INVENTOR
Christopher A. Shea

C. A. SHEA.
WINDSHIELD CLEANER.
APPLICATION FILED JAN. 10, 1920.

1,345,330.

Patented June 29, 1920.
2 SHEETS—SHEET 2.

INVENTOR
Christopher A. Shea
BY

ATTORNEY

UNITED STATES PATENT OFFICE.

CHRISTOPHER A. SHEA, OF NEW YORK, N. Y.

WINDSHIELD-CLEANER.

1,345,330.   Specification of Letters Patent.   Patented June 29, 1920.

Application filed January 10, 1920. Serial No. 350,500.

*To all whom it may concern:*

Be it known that I, CHRISTOPHER A. SHEA, a citizen of the United States, residing at 27 William street, New York, N. Y., have invented a new and useful Improvement in Windshield-Cleaners, of which the following is a specification.

This invention relates to means for removing snow and rain from automobile windshields during stormy weather, and its main object is to provide mechanism for this purpose which is automatic in its operation and requires a minimum of attention by the operator of the automobile. Another object is to provide such a mechanism as will not obstruct the operator's view toward the front, and a further object is to provide means whereby the mechanism can be readily put in position on the windshield and as readily removed when not needed. Still another object is the provision of convenient means for starting and stopping the mechanism and also to provide for placing said means in a position convenient for the operator.

The means I prefer to employ to accomplish the above objects, together with other novel features not hereinbefore mentioned but which will appear as the description progresses, are illustrated in the drawing accompanying and forming part of this specification, and in which—

Figure 1 is an elevation of my automobile windshield cleaning mechanism as seen from the rear of the windshield.

Fig. 2 is a side elevation of this form of windshield cleaning mechanism, and

Fig. 3 is an elevation of a modified form of my invention also seen from the rear of the windshield.

Like characters of reference refer to like parts in all the figures of the drawing.

Figure 4:
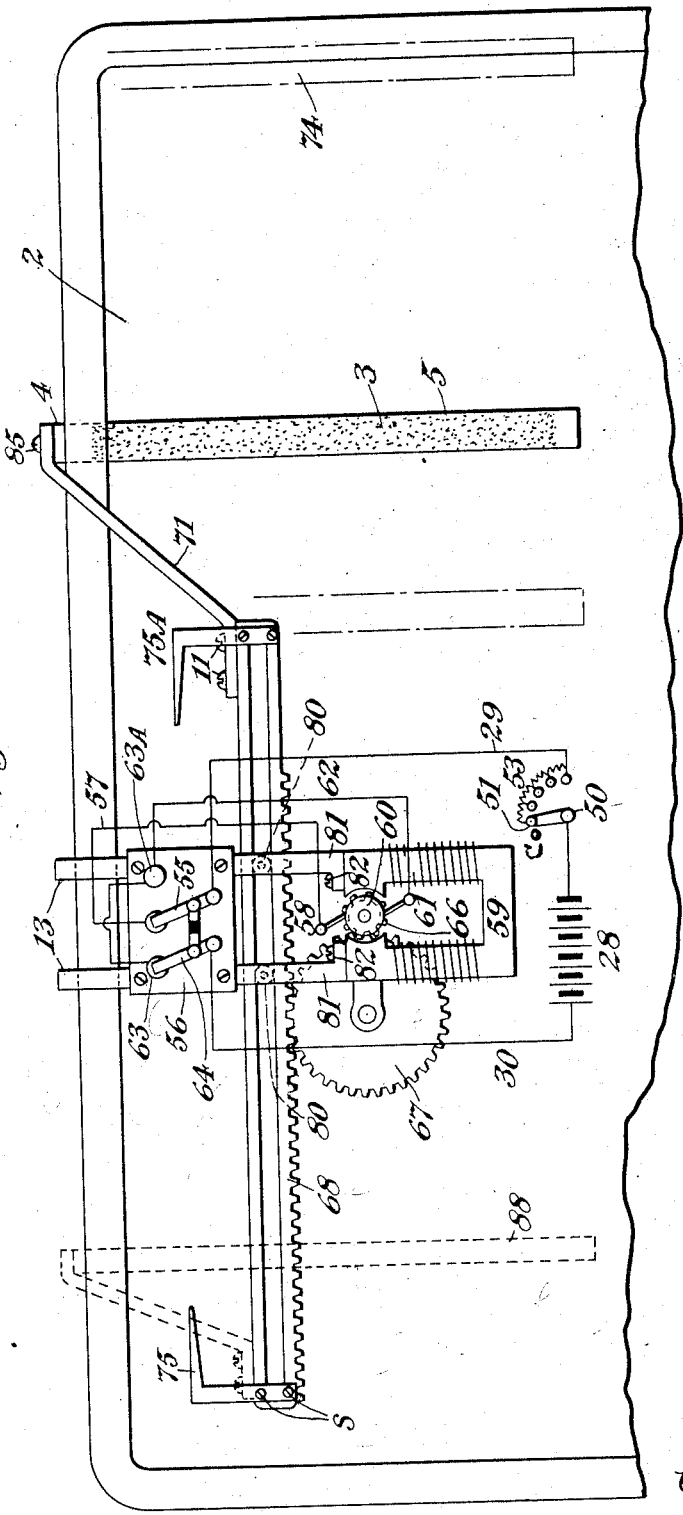
Fig. 4 is an elevation of another modified form of my invention as seen from the rear of the wind shield.

It is a well known fact that automobile operation is considerably more dangerous and liable to accidents in stormy weather than in fair, and one of the main reasons for this is that snow and rain collect on the transparent windshields and obstruct the view of the operator of the car. This renders it much more difficult to avoid accidents and it also consumes time in the endeavor to clean the windshields by hand.

My invention will prevent accidents from the above cause and save the time of the operator in attempts to keep the windshields clear by hand, and provides that a clear and unobstructed view through the operator's part of the windshield may be had at all times during the stormy or frosty weather.

Referring to Figs. 1 and 2 of the drawing which illustrate the construction of the preferred form of my invention, the numeral 2 designates the windshield of an automobile, and 3 designates a member which I term a cleaning member, which may be of any suitable construction and form for removing snow, rain, frost or moisture from the exposed front surface of the windshield. From the mode of the operation of the form of the cleaning device illustrated herewith, I also term this a wiper or wiping device, and it embodies a stiffening portion or back 4, and a plurality of bristles or stiff fibers of suitable material, such as rubber, or the like, and designated by 5. The said members 5 are adapted to wipe or brush off snow, frost, rain, steam and moisture from the exposed front surface of the windshield.

The said cleaning member may have any suitable movement imparted to it, such as movement of a to and fro character which is of great utility in removing snow and moisture surfaces of the above type. The mechanism I prefer to employ for bringing about such movement is of a strictly reciprocating type, and also embodies means for supporting the cleaning device or wiper 3 in its working position. The portion 4 of the wiper extends up slightly above the top of the windshield, then back over the latter and toward the left where it is secured to a member 6. which I term a cross-head and which is adapted to have reciprocating movements imparted to it. The member 6 is substantially the shape of a capital letter T, and comprises upper and lower horizontal portions or bars 7 and 8, and a connecting vertical portion 9 which is provided with a slot 10. The member 4 is fastened to the right hand end of the bar 7 by suitable means such as screws 11. The cross-head 6 is adapted to slide between suitable guides in the stationary portion or frame of the mechanism.

Any suitable frame may be employed, but I use a frame which embodies a pair of upright members or bars 12, more clearly shown in Fig. 2, which are bent at the top to form hooks 13 fitting over the top portion of the windshield with just enough snugness to cause them to remain in place without additional fastening, which, however, may be used. The movable part of the mechanism may be operated by any suitable means, such as an electric motor 14, and the frame 15 of such motor may be connected to the upright members 12 by suitable means, such as two right-angled members 16 at the top and two brackets 17 at the bottom, the said right-angled members and brackets being secured to the motor frame and to the members 12 by suitable means such as the screws 18.

Any suitable guides may be provided for the bar 7 of the cross-head 6 such as those formed between the projections 19 on the members 16 and the extensions 19 of the members, and the bar 8 may be guided as between projections 21 in the brackets 17, more clearly shown in Fig. 2. There is a horizontal slot 22 in bar 7 through which the ends of the members 16 are passed so that when the said members 16 are fastened by the screws 18, the cross-head cannot be displaced laterally.

The electric motor has two bearing brackets 23 secured to its frame 15 and said bearing brackets house the armature shaft 24 which carries the armature 25 and commutator 26. Brushes 27 are located in suitable holes in the bearing brackets 23, and a suitable source of electrical supply such as the storage battery 28, is connected to the motor by conductors 29 and 30. For the purpose of starting and stopping the motor a switch 31 is provided which may be of any suitable type. The field magnets also may be of any suitable form and ordinarily are shunt wound.

At the forward end of the armature shaft 24 is a projecting member or cut out disk, 32 which is ordinarily made of very light construction, such as of an alloy of aluminum. A crank pin 33 is fastened to the member 32 near its end and operates in the slot 10 of the cross-head 6 for imparting to and fro movements to the cross-head and the cleaning member 3 secured thereto.

The operation of the above mechanism is as follows:

The windshield cleaning mechanism is placed in position on the windshield 2 by passing it down over the edge thereof with the wiper 3 at the front toward the right hand side of the windshield, and with the motor and operating mechanism on the left side at the rear. The mechanism is started by closing the switch 31, thus energizing the motor 14 and causing the armature 25, shaft 24, and member 32 to rotate. The crank pin 33 operating in the slot 10 now causes the cross-head 6 to reciprocate and with it the cleaning member or wiper 3. These parts may operate at a very rapid rate so that the bristles or fibers 5 readily brush or wipe off the flakes of snow or drops of rain as they collect on the part of the windshield in front of the operator of the automobile.

The modification illustrated in Fig. 3 differs from the foregoing form in the means employed for reciprocating the wiper 3, and instead of having a cross-head it is provided with a frame 35 having slots 36 by which it is guided by means of screws 37 on the bars 12, to which also is secured the frame 15 of the electric motor 14. The frame 35 has rack teeth 38 on the inside, at both top and bottom, which rack teeth are adapted to mesh with the teeth of the disk 39 secured to the shaft 24 of the motor armature 25. The wiper 3 is fastened to the frame 35 by screws 40.

When the motor armature is caused to rotate on energizing the motor 14, the teeth of the disk 39 engage the teeth of one of the racks on the frame 35 and move the latter in one direction until the disk teeth pass out of mesh with one first rack and engage with the second rack driving the frame 35 in the reverse direction. These operations continue and the frame 35 and wiper 3 are reciprocated at a rapid rate so that the snow or rain is brushed or wiped off the windshield.

In Fig. 4 there is shown a device for accomplishing the same purpose. When switch 50 is placed on contact 51, current will flow from battery 28 through resistance 53, wire 29 lever 55 of reversing switch 56, wire 57, brush 58 of motor 59 through the armature 60 thereof, brush 61, wire 62, to contact 63, lever 64 of switch 56, wire 30 and back to the battery 28. The flow of current will operate the motor 59, the armature 60, of which will revolve.

Connected with the armature 60 is a pinion 66 which enmeshes with gear 67, which, in turn, enmeshes with the teeth of rack 68. As the armature 60 revolves, the gear 67 in revolving, will move the rack 68 in, we will say, a right handed direction.

Secured to the rack 68 by means of screws 11 is the support 71 for the cleaner 5, which is located outside the glass, and when the rack 68 moves in a right handed direction the cleaner 5 will move with it, the rubber 3, or other material, passing over the surface of the glass and removing snow, rain, steam or other obstruction to the vision of the driver of the vehicle.

When the rack 68 reaches the position shown by the dotted cleaner 74, contact piece 75, secured to rack 68, by means of screws S will strike lever 64 of switch 56, throwing it over to a reverse position, which automatically reverses the direction of the current flowing through motor 59. The direction will then be by way of switch 50, resistance 53, wire 29, lever 55, contact 63ᴬ, wire 62, brush 61, through the armature 60, brush 58, wire 57, lever 64 and back to the battery 28, by way of wire 30.

When this reversal of current takes place, the armature of motor 59 revolves in the opposite direction, moving the rack in a left handed direction. When the rack 68 reaches a position where the contact piece 75ᴬ strikes lever 55, it will be thrown over, and the direction of current reversed. This causes armature 60 to revolve in the opposite direction which then moves the rack 68 in a right handed direction. This back and forth movement of the rack will continue indefinitely as long as current flows through the armature 60.

The speed of the armature and cleaner may be varied by means of the resistance 53.

The field of the motor 59 is permanently magnetic, in this particular instance; therefore, a reversal of current through the armature alone will reverse the direction of rotation. I do not, however, confine myself to a motor with a permanent field, as any motor will answer the purpose.

The rack 68 runs upon the rollers 80 supported by the frame 81, which, in turn, supports the motor 59 by means of screws 82 and the reversing switch 56. The whole unit may be readily hung upon the upper frame of the windshield as previously described.

The rubber cleaner 5, may be detached from the support 71 by means of the screw 85; both sides of the wind shield may be cleaned at the same time, the right hand side by means of cleaner 5 and the left hand side by means of cleaner 88 shown by dotted lines. Either one or both may be used.

By my construction, the motor is within the car and behind the shield, insuring a dry condition of the mechanism. Only the cleaner extends outside the glass.

The gear 67 is used to reduce the speed of the rack 68. It is not essential, however, for the purpose, as the resistance 53 may be used for slowing down or increasing the speed of the armature, and likewise, the cleaner.

The batteries shown at 28 may be storage or dry cells. By placing switch 50 on contact C, the circuit of battery 28 will be opened and the motor cease to operate.

In this specification windshield is understood to include any other device of the sort such as a front window in a closed automobile, electric car, or other vehicle through which the operator looks ahead to guide or operate the vehicle.

What I claim is:—

1. In a windshield cleaning mechanism, the combination of a stationary frame supported at one side of the windshield, a cleaning brush, a slidable overhanging member mounted on the frame and supporting the brush on the other side of the windshield, means for reciprocating said slidable member including a stationary rotary electric motor secured to the stationary frame, and a member on the motor shaft for engagement with the slidable member for reciprocating said member.

2. In a windshield cleaning mechanism, the combination of a frame embodying a hook at the upper part whereby it may be mounted in a stationary position at one side of a windshield, a cleaning brush, a slidable overhanging member mounted on the stationary frame and supporting the brush on the other side of the windshield and also provided with a transverse slot, and means for reciprocating said slidable member including a stationary electric motor secured to the stationary frame, a crank on the motor shaft and a crank pin operating in said transverse slot.

In testimony whereof I have signed my name to this specification in the presence of two subscribing witnesses this 8th day of January, 1920.

CHRISTOPHER A. SHEA

Witnesses:
HARRIS L. GREENE,
A. P. BERSOHN.